United States Patent
Misner

(10) Patent No.: US 6,257,031 B1
(45) Date of Patent: Jul. 10, 2001

(54) IGNITION LOCK OPERABLE WHEN KEY IS REMOVED

(75) Inventor: Michael O. Misner, Lake Villa, IL (US)

(73) Assignee: The Eastern Company, Wheeling, IL (US)

( * ) Notice: Subject to any disclaimer, the term of this patent is extended or adjusted under 35 U.S.C. 154(b) by 0 days.

(21) Appl. No.: 09/343,306

(22) Filed: Jun. 30, 1999

(51) Int. Cl.$^7$ .................................................. B60R 25/02
(52) U.S. Cl. ................................ 70/252; 70/358; 70/493; 70/DIG. 30
(58) Field of Search ............................ 70/252, 358, 493, 70/DIG. 30

(56) References Cited

U.S. PATENT DOCUMENTS

| | | | | |
|---|---|---|---|---|
| 1,334,292 | * | 3/1920 | Cox ........................................ | 70/493 |
| 1,342,728 | * | 6/1920 | Welch .................................... | 70/252 |
| 1,657,402 | * | 1/1928 | Kenworthy et al. ................... | 70/252 |
| 1,726,202 | * | 8/1929 | Tibbetts ................................. | 70/252 |
| 1,748,255 | * | 2/1930 | Tibbetts ....................... | 70/DIG. 30 X |
| 2,060,951 | * | 11/1936 | Rae et al. .................... | 70/DIG. 30 X |
| 2,083,161 | * | 6/1937 | Gilpin .................................... | 70/252 |
| 2,169,796 | * | 8/1939 | Gilpin .................................... | 70/252 |
| 2,199,226 | * | 4/1940 | Lowe ..................................... | 70/252 |
| 3,740,979 | * | 6/1973 | Crepinsek ............................. | 70/139 |
| 3,793,497 |   | 2/1974 | DiGaetano ............................ | 200/44 |
| 3,828,594 | * | 8/1974 | Yamamoto ............................ | 70/252 |
| 4,397,167 | * | 8/1983 | Maiocco ......................... | 70/252 X |
| 4,716,748 | * | 1/1988 | Watanuki et al. ..................... | 70/252 |
| 4,827,744 | * | 5/1989 | Namazue et al. ..................... | 70/252 |
| 5,485,735 |   | 1/1996 | Laabs et al. .......................... | 70/358 |
| 5,531,084 |   | 7/1996 | Laabs et al. .......................... | 70/409 |
| 5,563,387 |   | 10/1996 | Myers et al. ...................... | 200/43.03 |

FOREIGN PATENT DOCUMENTS

| | | | | |
|---|---|---|---|---|
| 1555300 | * | 10/1970 | (DE) ..................................... | 70/252 |
| 2053775 | * | 5/1972 | (DE) ..................................... | 70/252 |
| 2821675 | * | 11/1979 | (DE) ..................................... | 70/252 |
| 2822098 | * | 11/1979 | (DE) ..................................... | 70/358 |
| 1915650 | * | 1/1980 | (DE) ..................................... | 70/252 |
| 1340826 | * | 9/1963 | (FR) ..................................... | 70/252 |
| 1521575 | * | 3/1968 | (FR) ..................................... | 70/252 |
| 2425352 | * | 1/1980 | (FR) ..................................... | 70/252 |
| 2464165 | * | 4/1981 | (FR) ..................................... | 70/252 |
| 2480213 | * | 10/1981 | (FR) ..................................... | 70/252 |
| 1022858 | * | 3/1966 | (GB) ..................................... | 70/252 |
| 2154652 | * | 9/1985 | (GB) ..................................... | 70/358 |
| 62-128857 | * | 6/1987 | (JP) ..................................... | 70/252 |

* cited by examiner

Primary Examiner—Lloyd A. Gall
(74) Attorney, Agent, or Firm—David A. Burge

(57) ABSTRACT

A key-operated ignition lock has a housing configured to protectively shield an electrical switch. An operating knob has a tubular body that extends through a first passage defined by the housing, and is rotable therein between a plurality of angular positions including on "off" position. The tubular body defines a second passage wherein elements including a key-receiving plug of a lock mechanism are journaled for rotation between "locked" and "unlocked" positions. Alignable bores formed 1) in the tubular body, 2) in a locking plate that surrounds the tubular body, 3) in the plug, and 4) in a barrel that surrounds the plug support an end-to-end arrangement of pins that permit a suitably configured key to be inserted into the plug only when the knob is in its "off" position, and to permit the knob to be rotated out of its "off" position only when the key is removed from the plug. To concurrently retain the knob in the first passage and the lock mechanism in the second passage, slots are formed in over-lying side portions of the tubular body of the knob and in the barrel of the lock mechanism to receive a retaining bar that is connected to the housing. A retractable bolt carried at the rear of the tubular body extends from the tubular body to connect the knob to the electrical switch when the lock is "unlocked," and retracts when the lock is "locked" to disconnect the knob from the switch.

57 Claims, 10 Drawing Sheets

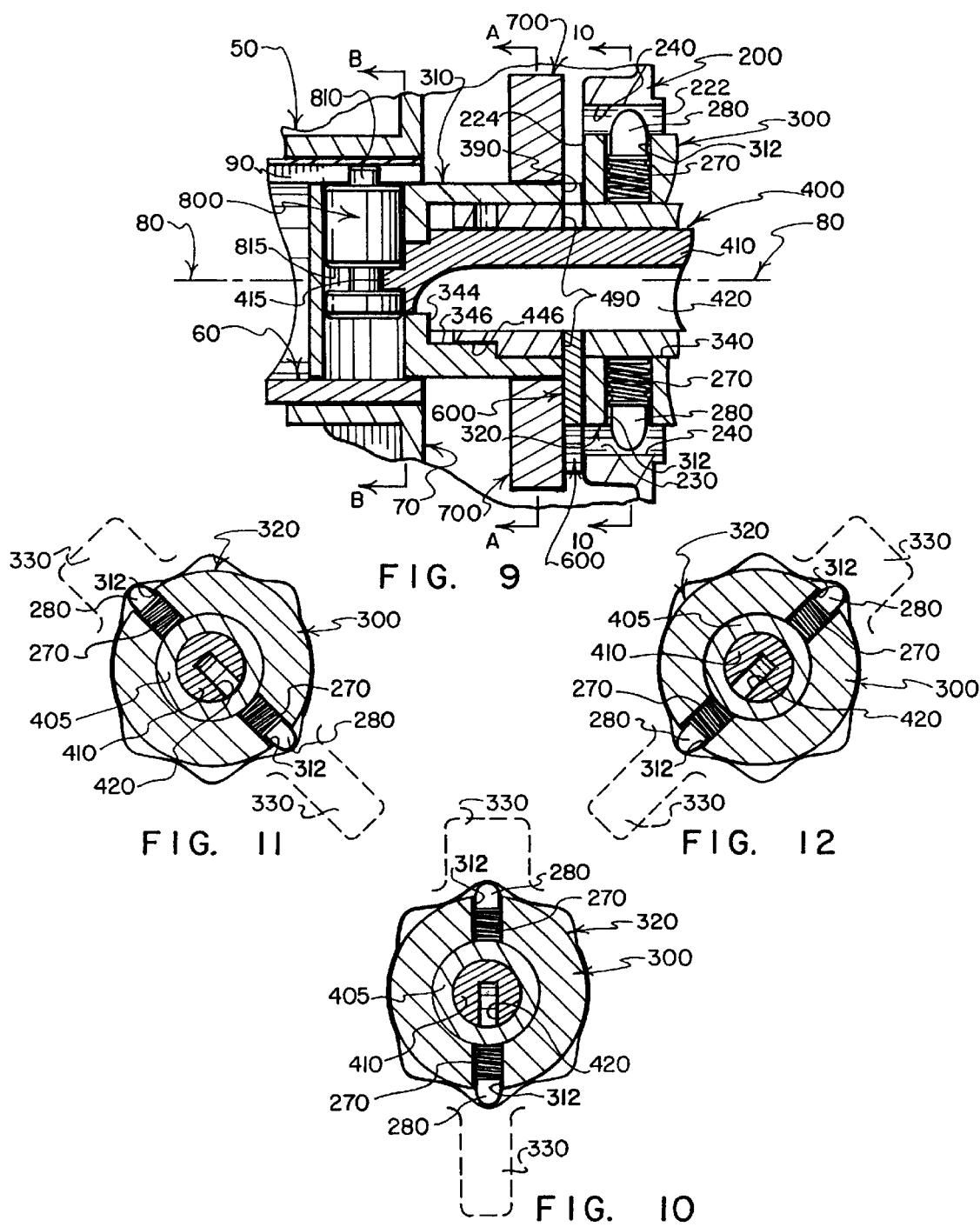

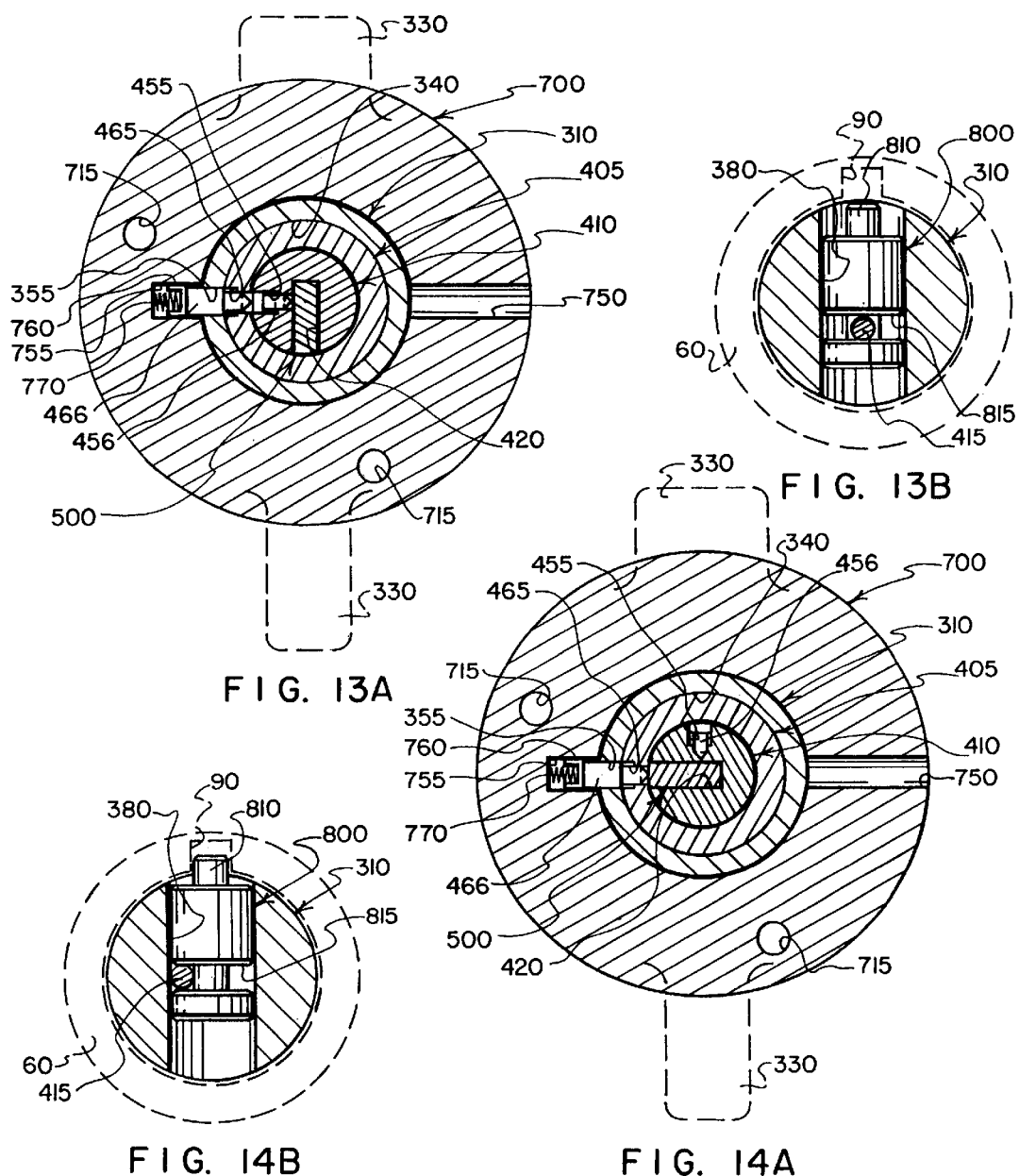

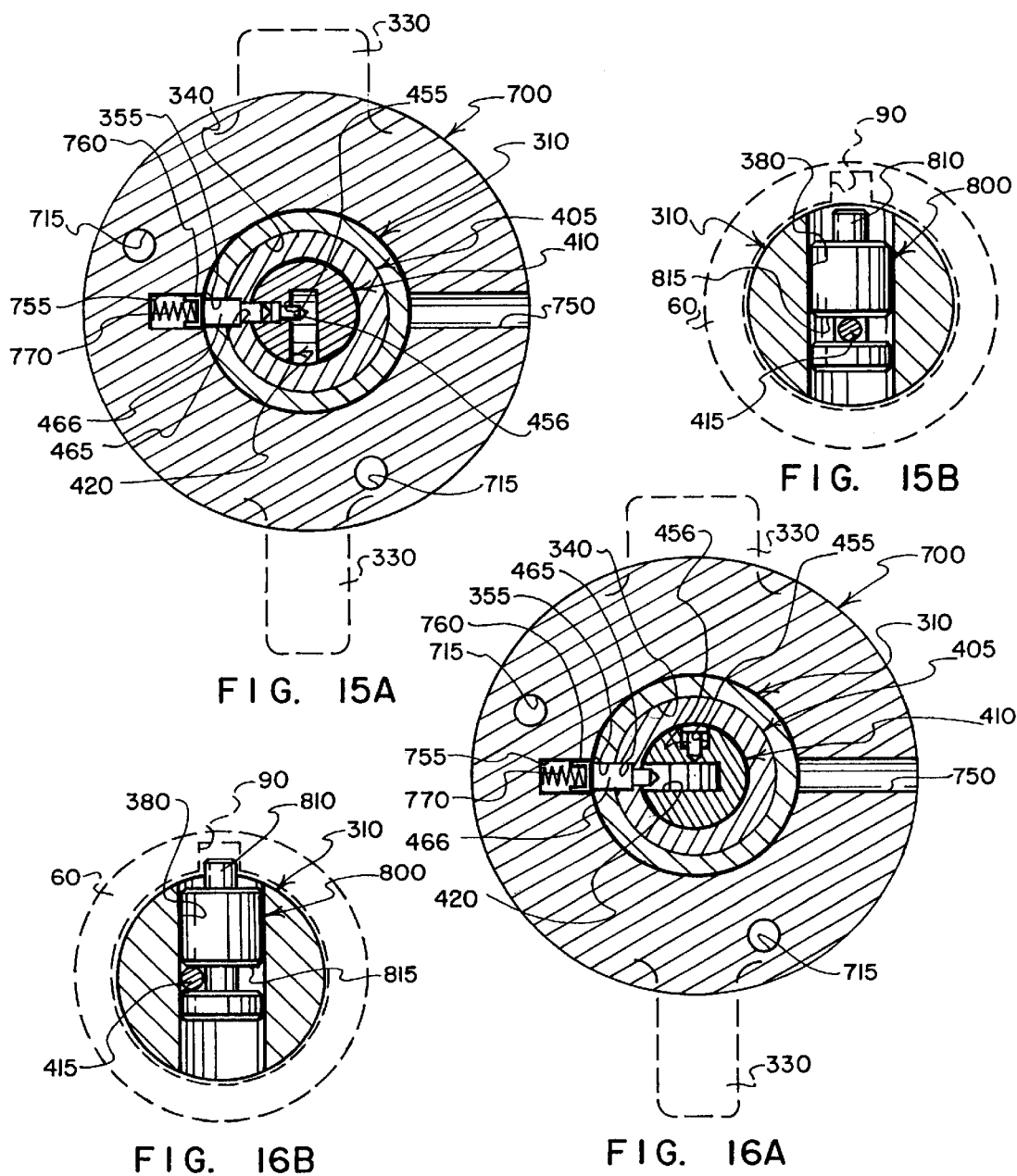

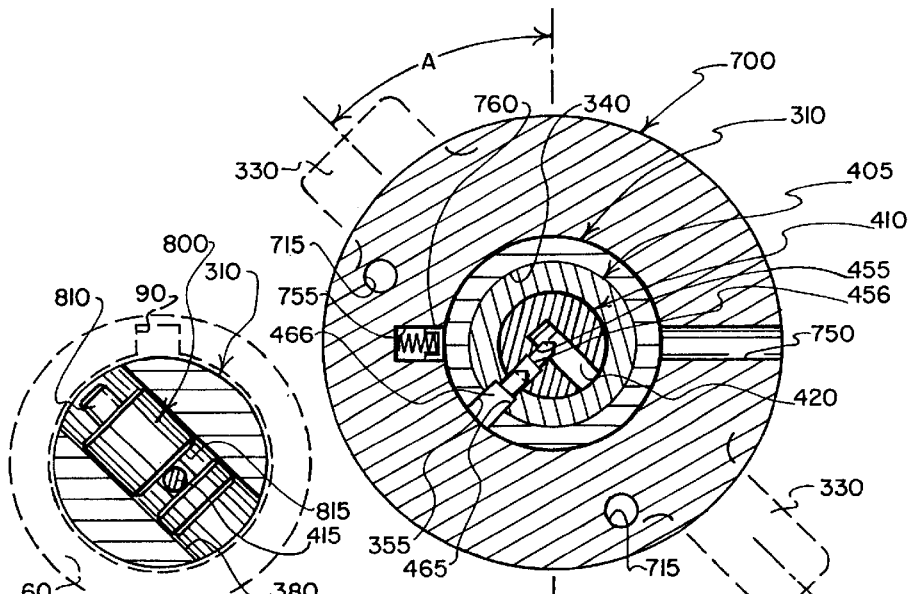
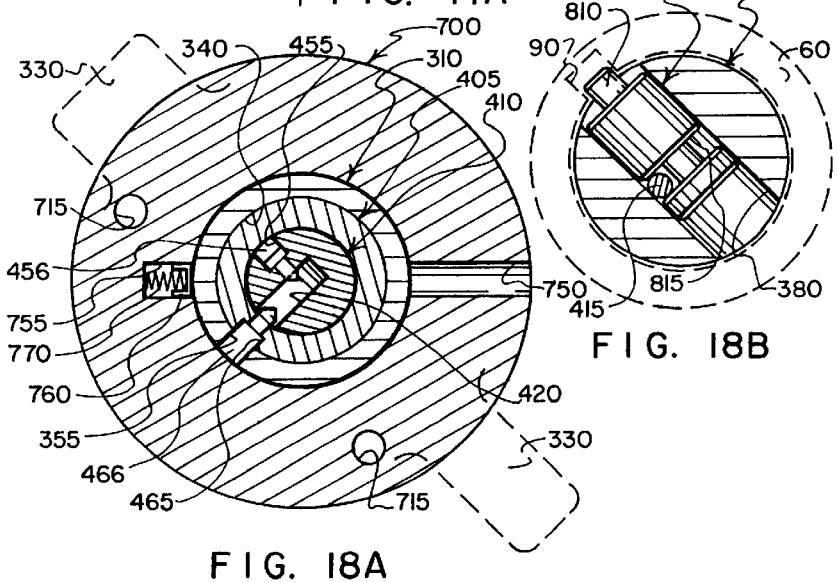

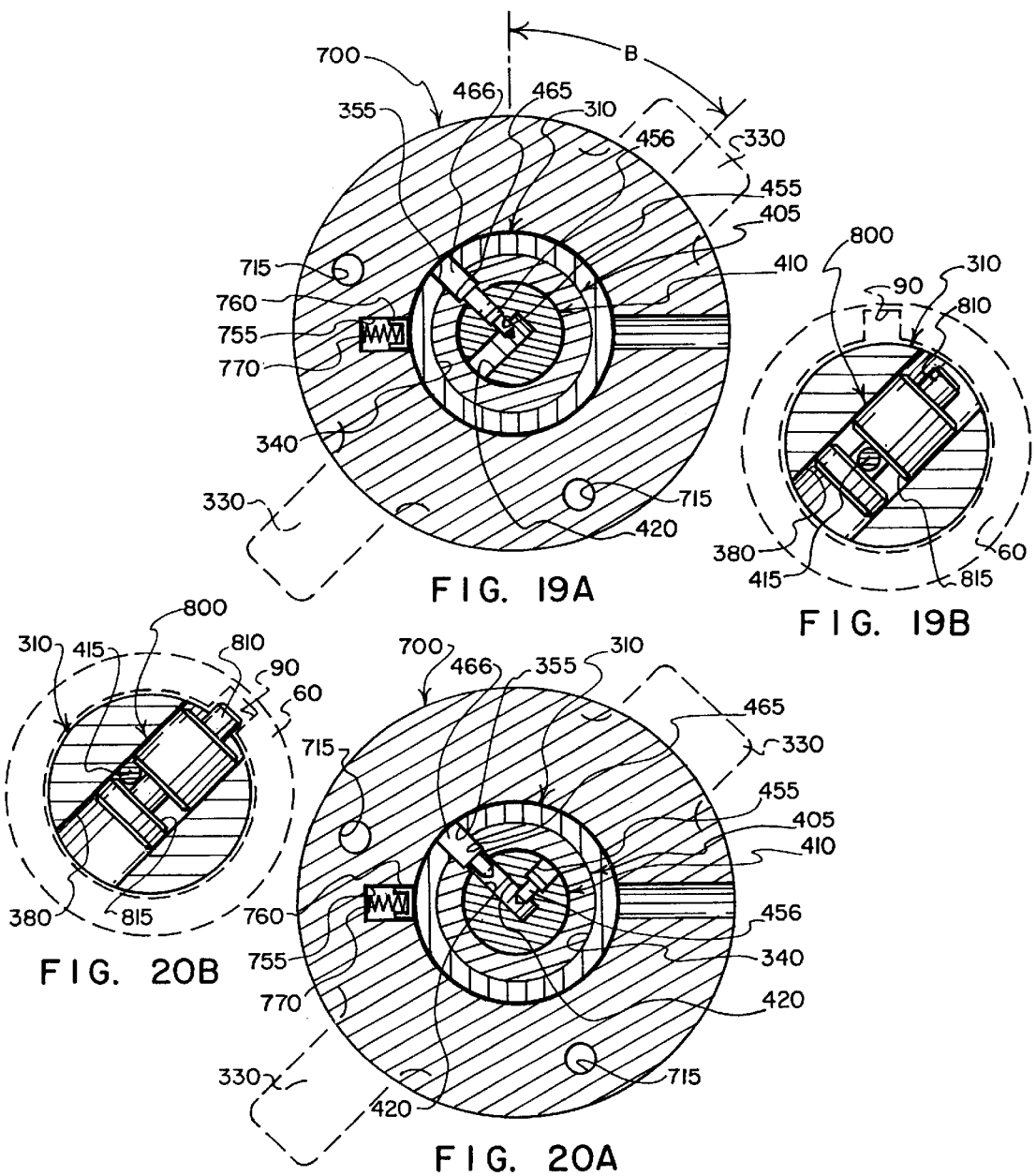

IGNITION LOCK OPERABLE WHEN KEY IS REMOVED

BACKGROUND OF THE INVENTION

1. Field of the Invention

The present invention relates to a key operated lock that, while designed to accommodate special ignition switch needs of high quality motorcycles, also offers features that, taken alone or in combination, are well suited for use in other key operated lock applications. More particularly, the present invention relates to features of a key operated lock having a "hand positioned operator" or "knob" that is rotatable between or among a plurality of detented angular positions, wherein the knob has a tubular body that carries a lock mechanism having a barrel that journals a key-receiving plug for separate rotation between "locked" and "unlocked" positions when a properly configured key is inserted into the plug, with novel features including a unique way the knob and the lock mechanism are retained in a protective housing of the lock by utilizing a retaining bar that is closely received in a slip-fit within aligned, transversely extending slots formed in overlying side regions of the tubular body of the knob and the barrel of the lock mechanism, and unique ways: 1) of permitting the key to be inserted into and removed from the plug when the plug is in either of its "locked" and "unlocked" positions, but only when the knob is in its "off" position; 2) of permitting the knob to be rotated out of its "off" position but only when the key has been removed from the plug; and, 3) of providing a retractable bolt carried at the rear of the tubular body of the knob which extends to drivingly connect the knob to an electrical switch for operating the switch in response to rotation of the knob when the lock is "unlocked," and which retracts when the lock is "locked" to disconnect the knob from the switch.

2. Prior Art

Ignition locks for motorcycles and other engine powered equipment often are provided with a so-called "hand positioned operator" or "knob" that is rotatable between or among a plurality of detented angular positions to operate an electrical switch. When the lock is "unlocked" a driving connection is established between the knob and the electrical switch. When the lock is "locked" the knob is disabled from operating the switch. Ignition locks of this type typically permit their knobs to move between or among angular positions that are labeled "accessory on," "off" and "engine on"—or, more simply "ACC," "OFF" and "ON."

Some ignition locks of this type can be defeated by utilizing a wrench or other tool to force their knobs to rotate to "on" positions. To provide greater security, others of these ignition locks are provided with mechanisms for rendering their knobs "free wheeling" when the locks are locked so that rotation of their knobs between or among various angular positions will not cause operation of associated electrical switches.

In automobiles and trucks where little vibration of the ignition lock is likely to be encountered, it is accepted practice for the ignition key to remain in the key-receiving opening of the ignition lock while the vehicle is in operation. However, in motorcycles and other types of engine operated equipment where vibration of the ignition lock may be prevalent, it is desirable for the ignition key to be removed during vehicle operation so that the key will not vibrate out of the key-receiving opening and become lost. To ensure that the ignition key of a motorcycle is removed rather than left in place during operation of the motorcycle's engine, it has been proposed that the knob of the ignition lock be prevented from moving out of its "off" position unless and until the ignition key is withdrawn from the key-receiving opening.

One type of key operated lock mechanism that has received relatively little use in vehicle ignition locks is disclosed in U.S. Pat. No. 5,485,735 issued Jan. 23, 1996 to Timothy P. Laabs et al, and also in U.S. Pat. No. 5,531,084 issued Jul. 2, 1996 to Timothy P. Laabs et al (referred to hereinafter as the "Dimpled Key Lock Patents"), the disclosures of which are incorporated herein by reference. In accordance with the teachings of the Dimpled Key Lock Patents, two or more rows of spring projected tumblers having convexly rounded inner ends are received in dimple-like recess formations that are provided in at least two of the four side surfaces of a key of generally rectangular cross-section to enable a correctly dimpled key to operate a cam that is located at the rear of the lock mechanism. In preferred practice, the present invention makes use of selected features of key operated lock mechanisms of the type disclosed in the Dimpled Key Lock Patents.

SUMMARY OF THE INVENTION

The present invention provides an ignition lock that is especially well suited for use with high quality motorcycles, which includes novel features that also may be utilized to good advantage in other key operated lock applications.

One need addressed by the preferred practice of the present invention is the provision of a secure type of ignition lock that will prevent a motorcycle from being operated unless and until its ignition key has been withdrawn from a key-receiving opening of the lock—a lock that has a "free wheeling" operating knob that will move without operating electrical switches when the lock is "locked." To accommodate this need, 1) an operating knob is provided that can be moved out of its "off" position only when the ignition key has been removed from the key receiving opening; 2) a lock mechanism is provided that enables the key to be removed when a key-receiving plug of the lock mechanism is rotated to either of its "locked" and "unlocked" positions; and, 3) a disconnect mechanism is provided to decouple the electrical switch from the knob when the lock is locked to thereby render the knob "free wheeling" to prevent the lock from being defeated by forcing the knob to an "on" position when the lock is locked.

Another need addressed by the present invention is the provision of a relatively simple means of retaining in secure assembled relationship a plurality of concentrically nested relatively rotatable lock components such as a knob which is rotatable between a plurality of angular positions relative to a housing that supports the knob, and a key-receiving plug of a lock mechanism that is journaled by a barrel of the lock mechanism for rotation between locked and unlocked positions relative to the knob which houses the lock mechanism. A novel approach employed by the present invention to accommodate this need calls for aligned transversely extending slots to be provided in overlying side regions of a tubular barrel of the knob and of the barrel of the lock mechanism to receive in a slip fit therein a retaining bar that is connected to the housing. By this novel arrangement, the needs faced by the knob and the plug to be independently rotatable through limited ranges of movement can be accommodated while providing a lock that is easy to assemble, easy to lubricate and easy to disassemble when maintenance so requires.

To accommodate the need to prevent rotation of the knob out of its "off" position except when the key has been removed, and to prevent key insertion except when the knob is in its "off" position, a key-engageable pin arrangement is provided that extends into the key-receiving opening to block key insertion except when the knob is in its "off" position. The same aligned bores that house the key-engageable pin arrangement also cooperate with the key-engageable pin arrangement to block rotation of the knob out of its "off" position at all times except when the key is removed from the plug.

To provide a disconnect to selectively couple the key operated lock to the electrical switch that enables or disables the ignition system of the vehicle, a radially extensible-retractable bolt is provided near the rear end region of the tubular body of the knob that extends into a notch of a rotatable sleeve to drivingly connect the knob to the electrical switch when the lock is "unlocked," and that withdraws to drivingly disconnect the knob from the electrical switch when the lock is "locked." This extensible-retractable bolt is caused to extend and retract due to its being drivingly engaged by a cam that is defined by the rear end region of the plug of the lock mechanism. When the plug is in its locked position, the cam causes the bolt to retract; and, when plug is in its unlocked position, the cam causes the bolt to extend.

BRIEF DESCRIPTION OF THE DRAWINGS

Other features and a fuller understanding of the invention may be had by referring to the following description and claims taken in conjunction with the accompanying drawings, wherein:

FIG. 9 is an enlargement of a central portion of the sectional view of FIG. 2;

FIG. 10 is a sectional view as seen from a plane indicated by a line 10—10 in FIG. 9, showing the detenting of the knob of the lock in its OFF position;

FIG. 11 is a sectional view similar to FIG. 10 but showing the detenting of the knob of the lock in its ACC position;

FIG. 12 is a sectional view similar to FIGS. 10 and 11 but showing the detenting of the knob of the lock in its ON position;

FIG. 13A is a sectional view as seen from a plane indicated by a line A—A in FIG. 9, with components of the lock positioned as they arrange themselves when the knob is in its OFF position, when the lock mechanism is LOCKED, and when the key is INSERTED;

FIG. 13B is a sectional view as seen from a plane indicated by a line B—B in FIG. 9, with the components of the lock positioned as in FIG. 13A;

FIG. 14A is a sectional view as seen from a plane indicated by a line A—A in FIG. 9, with components of the lock positioned as they arrange themselves when the knob is in its OFF position, when the lock mechanism is UNLOCKED, and when the key is INSERTED;

FIG. 14B is a sectional view as seen from a plane indicated by a line B—B in FIG. 9, with the components of the lock positioned as in FIG. 14A;

FIG. 15A is a sectional view as seen from a plane indicated by a line A—A in FIG. 9, with components of the lock positioned as they arrange themselves when the knob is in its OFF position, when the lock mechanism is LOCKED, and when the key is REMOVED (it being noted that any differences between component orientations of FIGS. 13A and 15A results from the presence of an INSERTED key in FIG. 13A, and the absence of a key in FIG. 15A);

FIG. 15B is a sectional view as seen from a plane indicated by a line B—B in FIG. 9, with the components of the lock positioned as in FIG. 15A;

FIG. 16A is a sectional view as seen from a plane indicated by a line A—A in FIG. 9, with components of the lock positioned as they arrange themselves when the knob is in its OFF position, when the lock mechanism is UNLOCKED, and when the key is REMOVED (it being noted that any differences between component orientations of FIGS. 3.4A and 16A results from the presence of an INSERTED key in FIG. 14A, and the absence of a key in FIG. 16A);

FIG. 16B is a sectional view as seen from a plane indicated by a line B—B in FIG. 9, with the components of the lock positioned as in FIG. 16A;

FIG. 17A is a sectional view as seen from a plane indicated by a line A—A in FIG. 9, with components of the lock positioned as they arrange themselves when the knob is in its ACC position, when the lock mechanism is LOCKED, and when the key is REMOVED;

FIG. 17B is a sectional view as seen from a plane indicated by a line B—B in FIG. 9, with the components of the lock positioned as in FIG. 17A;

FIG. 18A is a sectional view as seen from a plane indicated by a line A—A in FIG. 9, with components of the lock positioned as they arrange themselves when the knob is in its ACC position, when the lock mechanism is UNLOCKED, and when the key is REMOVED;

FIG. 18B is a sectional view as seen from a plane indicated by a line B—B in FIG. 9, with the components of the lock positioned as in FIG. 18A;

FIG. 19A is a sectional view as seen from a plane indicated by a line A—A in FIG. 9, with components of the lock positioned as they arrange themselves when the knob is in its ON position, when the lock mechanism is LOCKED, and when the key is REMOVED;

FIG. 19B is a sectional view as seen from a plane indicated by a line B—B in FIG. 9, with the components of the lock positioned as in FIG. 19A;

FIG. 20A is a sectional view as seen from a plane indicated by a line A—A in FIG. 9, with components of the lock positioned as they arrange themselves when the knob is in its ON position, when the lock mechanism is UNLOCKED, and when the key is REMOVED; and, FIG. 20B is a sectional view as seen from a plane indicated by a line B—B in FIG. 9, with the components of the lock positioned as in FIG. 20A.

DESCRIPTION OF THE PREFERRED EMBODIMENT

Figure 1:
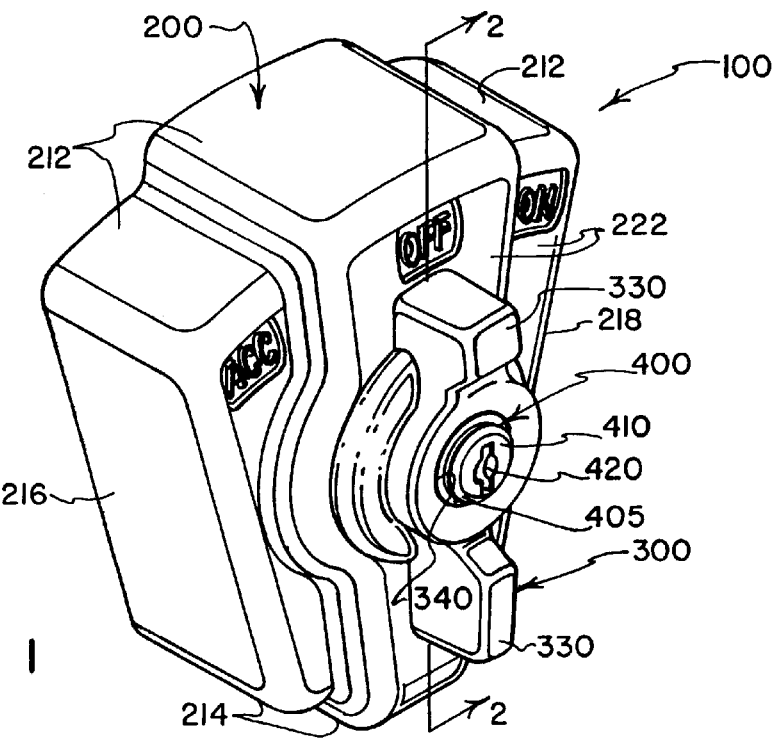
FIG. 1 is a perspective view of an ignition lock embodying the preferred practice of the present invention, with key operated components of the lock "locked" and with a knob of the lock in its "off" position.

Referring to FIG. 1, an ignition lock embodying the preferred practice of the present invention is indicated generally by the numeral 100. The ignition lock 100 provides a key lockable device for operating one or more electrical switches for controlling the supply of electricity to the engine of a motorcycle or other form of engine powered vehicle, and for controlling the supply of electricity to accessories of such a vehicle, for example radios, lights, horns, signalling devices, and the like.

Figure 2:
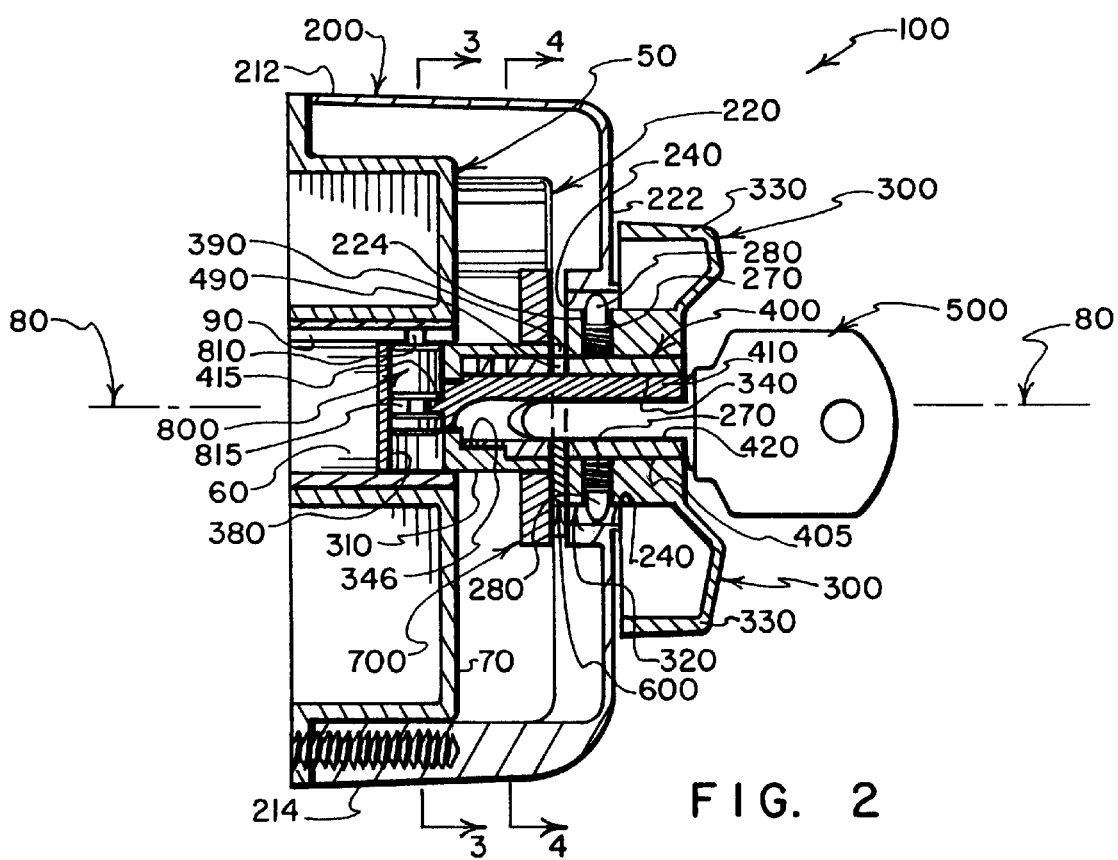
FIG. 2 is a sectional view thereof as seen from a plane indicated by a line 2—2 in FIG. 1.
Figure 5:
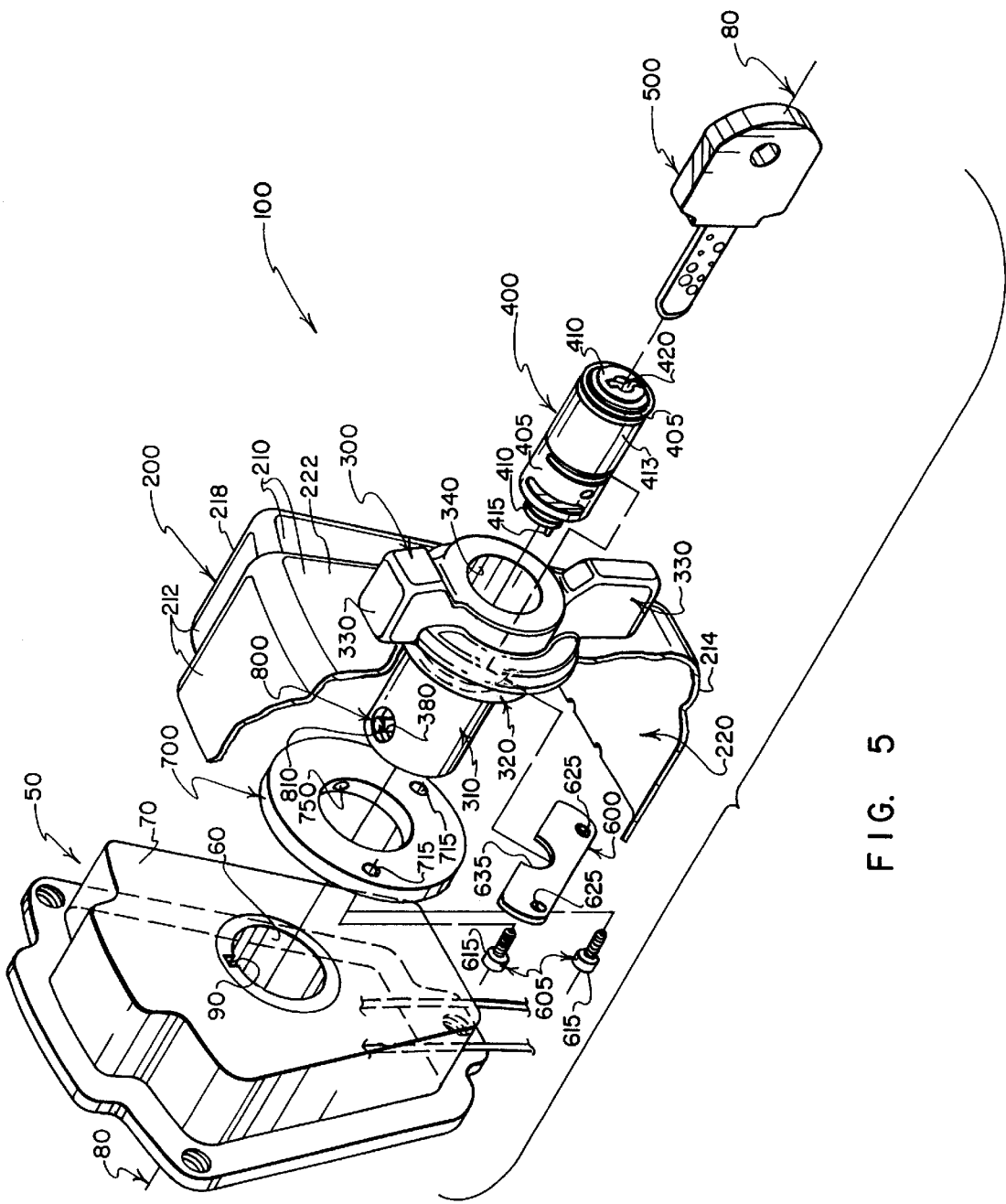
FIGS. 5 and 6 are exploded perspective views of selected components of the ignition lock.

In providing an overview of the ignition lock 100, reference principally will be made to FIGS. 2 and 5 wherein major components and assemblies of the ignition lock 100 are depicted. Referring to FIGS. 2 and 5, an electrical switch assembly operated by the lock 100 is indicated generally by the numeral 50. Although commercially available switches of a wide variety of types may be operated by the lock 100, in preferred practice the lock 100 is used with electrical switches of a type that are specially manufactured for Excelsior-Henderson motorcycles—switches that have an appearance quite similar to that indicated by the numeral 50 in FIGS. 2 and 5.

The switch 50 has an operating sleeve 60 that is supported by a switch housing 70. The sleeve 60 extends coaxially about an imaginary rotation axis 80, and is rotatable clockwise and counterclockwise about the axis 80. Protectively supported within the housing 70 are suitable sets of switch contacts (not shown) for making and breaking electrical circuits that direct electrical power to the engine and accessories of a motorcycle. The sleeve 60 defines a groove or slot 90 that extends along an upper interior side of the sleeve 60 in a direction that parallels the axis 80. An "off" position of the switch 50 obtains when the slot 90 is at the twelve o'clock position depicted in FIGS. 2 and 5. An "accessories on" or ACC position of the switch 50 obtains when the sleeve 60 is rotated counterclockwise approximately forty-five degrees (i.e., to an angular position indicated by the angle A in FIGS. 11 and 16A). An "engine on" or ON position of the switch 50 obtains when the sleeve 60 is rotated clockwise approximately forty-five degrees (i.e., to an angular position indicated by the angle B in FIGS. 12 and 18A).

Referring still to FIGS. 2 and 5, components of the lock 100 that provide for operation of the switch 50 in the manner just described include: a housing 200; a "hand positioned operator" or "knob" 300 that is supported by the housing 200 for rotation about the rotation axis 80 and that defines a tubular body 310 which extends rearwardly and into the sleeve 60 of the switch 50; a key lock mechanism 400 that is housed within the knob 300 and that provides a barrel 405 that houses a plug 410 which is rotatable about the axis 80 between "locked" and "unlocked" positions and which defines a key-receiving opening 420; a suitably configured key 500 for insertion into the key-receiving opening 420 for locking and unlocking the lock mechanism 400 by rotating the plug 410 between the "locked" and "unlocked" positions; a retainer bar 600 for retaining the housing 200, the knob 300 and the lock mechanism 400 in assembled relationship; an annular locking plate 700 for cooperating with an end-to-end arrangement of pins (described later in conjunction with FIGS. 13A, 14A, 15A, 16A, 17A, 18A and 19A wherein these pins are depicted) that are carried within alignable bores defined by the knob 300, the lock mechanism 400 and the locking plate 700 to add a set of desirable performance features to the lock 100; and an extensible-retractable bolt 800 that is movably supported by the tubular body 310 of the knob 300 toward the rear of a tubular body 310 for selectively extending into and withdrawing from the slot or groove 90 of the switch 50 to selectively establish and disestablish a driving connection between the knob 300 and the switch sleeve 60 to permit the knob 300 to operate the switch 50 when the lock mechanism 400 is unlocked. Other features and details of all these and other components of the ignition lock 100 will be described in the paragraphs that follow.

Figure 7:
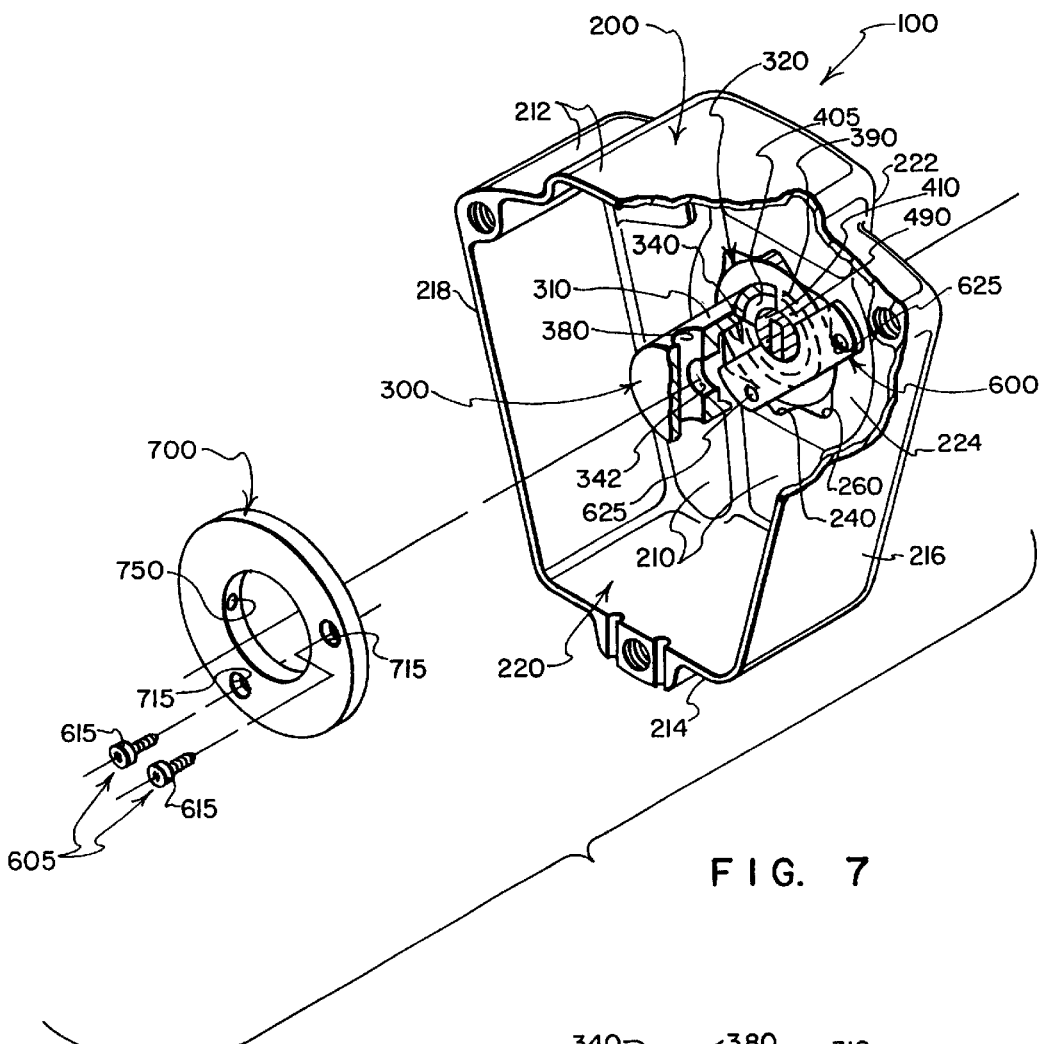
FIG. 7 is a perspective view showing rear portions of the lock housing, with a locking plate of the lock removed, and with portions of other components of the lock broken away to permit underlying features to be seen.

Referring to FIGS. 1, 2 and 7, the housing 200 has something of a keystone configuration, with its shape defined by a complexly configured front wall 210 that joins at its periphery with a top wall 212, a bottom wall 214 and side walls 216, 218 to surround a protected space 220. The front wall 210 can be thought of as providing a "mounting panel" having a front face 222 and a rear face 224 that surround a central opening or "first passage" 230 that provides access to the protected space 220.

Figure 6:
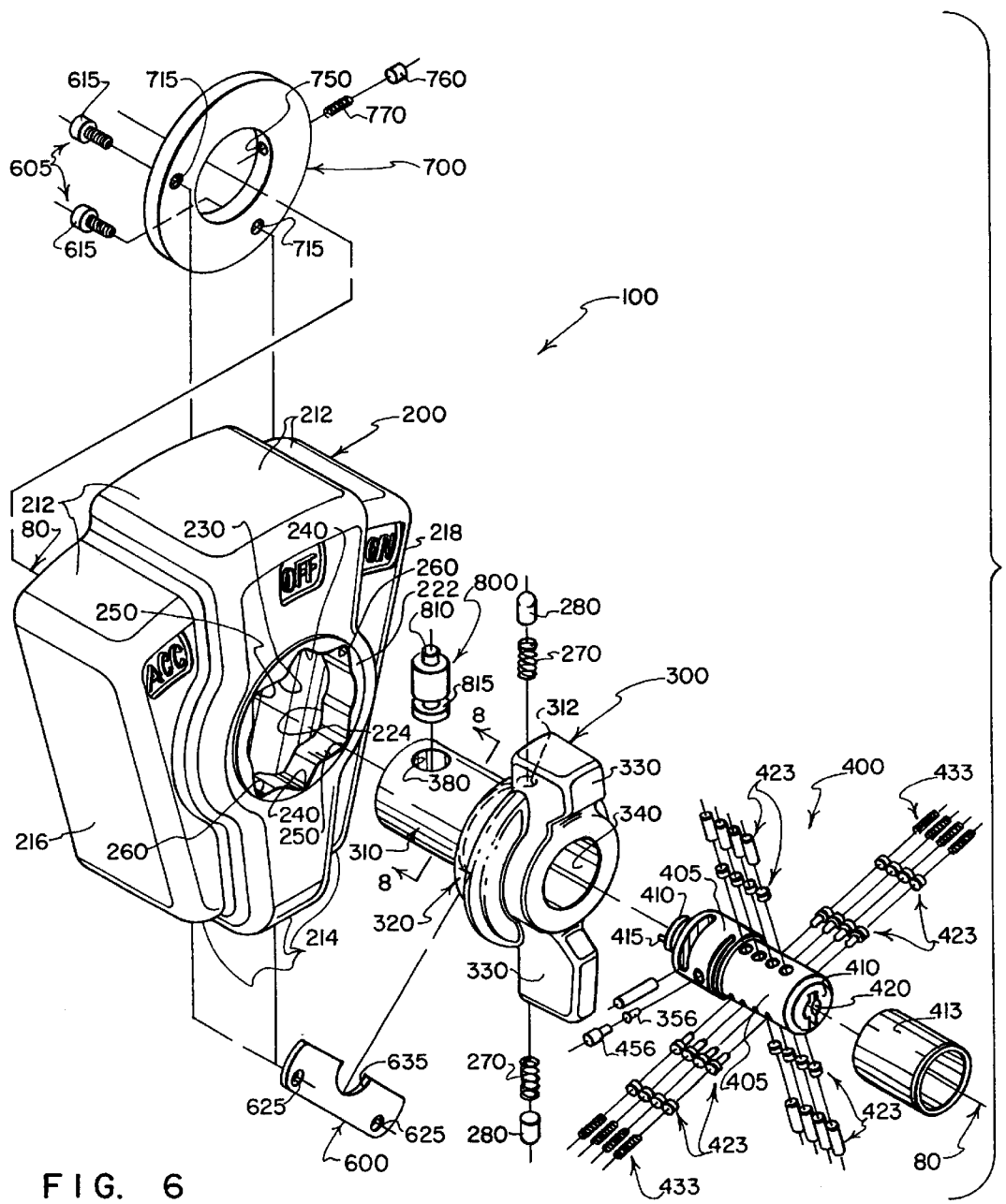

As is best seen in FIG. 6, the opening 230 has three opposed sets of V-shaped recesses formed in its opposite sides. A first set of V-shaped recesses 240 located at twelve and at six o'clock positions about the axis 80 correspond to an OFF position of the knob 300, and to the above-described OFF orientation of the sleeve 60 of the switch 50. A second set of V-shaped recesses 250 is located counterclockwise about the axis 80 relative to the first set of V-shaped recesses 240 (i.e., at an angular orientation indicated by the angle A in FIGS. 11 and 16A) that corresponds to an ACC position of the knob 300 and to the ACC position of the switch sleeve 60 (as described above). A third set of V-shaped recesses 260 is located clockwise about the axis 80 relative to the first set of V-shaped recesses 240 (i.e., at an angular orientation indicated by the angle B in FIGS. 12 and 18A) that corresponds to an ON position of the knob 300 and to the ON position of the switch sleeve 60 (as described above) Referring to FIGS. 7, 9 and 10, a cylindrical formation 320 of the knob 300 is journaled for rotation about the axis 80 by opposite left and right sides of the housing opening 230 (and by other portions of the housing opening 230 located between various ones of the recesses 240, 250, 260). In this manner, the knob 300 is rotatably mounted by the housing 200. Springs 270 and detent plungers 280 are carried in opposite end regions of a hole 312 (see FIGS. 6 and 9–12) that extends diametrically through the cylindrical formation 320. When the knob 300 is in its OFF position, the plungers 280 are biased by the springs 270 into engagement with the V-shaped recesses 240 as shown in FIGS. 9 and 10. When the knob 300 is in its ACC position, the plungers 280 are biased by the springs 270 into engagement with the V-shaped. recesses 250, as shown in FIG. 11. When the knob 300 is in its ON position, the plungers 280 are biased by the springs 270 into engagement with the V-shaped recesses 260, as shown in FIG. 12. By this arrangement, the knob 300 is "detented" in a manner that tends to bias it toward one or another of its OFF, ACC or ON positions.

Referring to FIGS. 5, 6 and 7, the retaining bar 600 and the annular locking plate 700 are rigidly connected to the housing 200 by a pair of threaded fasteners 605. The fasteners 605 have enlarged heads 615 that are received in stepped-diameter holes 715 formed through the annular locking plate 700. Threaded bodies of the fasteners 605 extend through aligned holes 625 formed in opposite end regions of the retaining bar 600, and thread into aligned holes (not shown) that open through the back face 224 of the housing 200.

Referring to FIGS. 5 and 6, the retaining bar 600 is notched, as indicated by the numeral 635, to prevent central portions of the retaining bar 600 from engaging the plug 410 of the lock mechanism 400 and from extending into the key-receiving slot 420 of the plug 410 (to ensure that the retaining bar 600 does not obstruct insertion, removal and rotary movements of the key 500).

Referring to FIG. 6, a radially extending bore 750 is provided in the annular locking plate 700 that does not go all of the way through the locking plate 700—and a spring 770 and an outer pin 760 are provided for insertion into the bore 750. Referring to FIG. 13A, while the bore 750 goes all of the way through one side of the annular locking plate 700, it goes only part-way through the opposite side of the annular locking plate 700 so as to define a short, closed-ended region 755 that opens toward the tubular body 310 of the knob 300. The spring 770 and the outer pin 760 are carried in the short bore portion 755.

Referring to FIGS. 2 and 6, the knob 300 provides enlarged, hand-graspable lugs 330 that are located on opposite sides of a central passage 340. The central passage 340 presents a circular cross-section as it extends well into the tubular body 310 of the knob 300. Toward the rear of the tubular body 310, the diameter of the central passage 340 is substantially reduced, as is indicated by the numeral 342 in FIG. 8. The reduced diameter rear end region 342 of the passage 340 intersects a transversely extending passage 380 that slidingly carries the extensible-retractable bolt 800.

Figure 8:
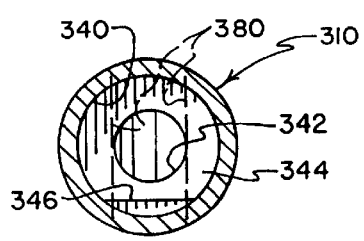
FIG. 8 is a sectional view as seen from a plane indicated by a line 8—8 in FIG. 6.

Referring to FIGS. 8 and 9, a transversely extending wall 344 provides an abrupt juncture between the relatively large diameter front end region of the passage 340 and the reduced diameter rear end region 342 of the passage 340. Extending forwardly a short distance from the wall 344 is a flat-surfaced projection 346 which is engaged by a mating flat-surfaced recessed region 446 (see FIG. 9) formed at the rear of the barrel 405 of the lock mechanism 400. The engagement of the flat surfaces 346, 446 is what prevents the barrel 405 from rotating relative to the knob 300 about the rotation axis 80. When the lock mechanism 400 is installed in the knob passage 340, the engagement of the flat surfaces 346, 446 permits the tubular barrel 405 to act as though it were formed integrally with the tubular body 310 of the knob 300—in the sense that no relative rotation is permitted to take place between the tubular barrel 405 of the lock mechanism 400 and the tubular body 310 of the knob 300.

The retaining bar 600 serves the dual purpose of retaining the lock mechanism 400 in the central passage 340 of the knob 300, and retaining the knob 300 in place on the housing 200 (with the cylindrical portion 320 of the knob 300 journaled in the housing opening 230). Referring to FIGS. 4, 7 and 10, these purposes are accomplished by providing aligned slots 390, 490 in overlying side regions of the tubular body 310 of the knob 300, and of the tubular barrel 405 of the lock mechanism 400. The slots 390, 490 closely receive central portions of the retaining bar 600 in a slip-fit that permits concurrent rotation of the tubular body 310 and the tubular barrel 405 relative to the housing 200 about the rotation axis 80. The slots 390, 490 cut transversely through much of the cross-section of the tubular body 310 and through much of the cross-section of the tubular barrel 405—enough, in fact, to ensure that the tubular body and barrel 310, 405 are able to rotate through about a quarter-turn movement, as required to permit the knob 300 to move from the ACC position (i.e., the angular position A depicted in FIGS. 11 and 16A) through the OFF position (i.e, the twelve o'clock position depicted in FIGS. 1–7, 9, 10, 12A, 13A, 14A and 15A) to the ON position (i.e., the angular position B depicted in FIGS. 12 and 18A).

Figure 3:
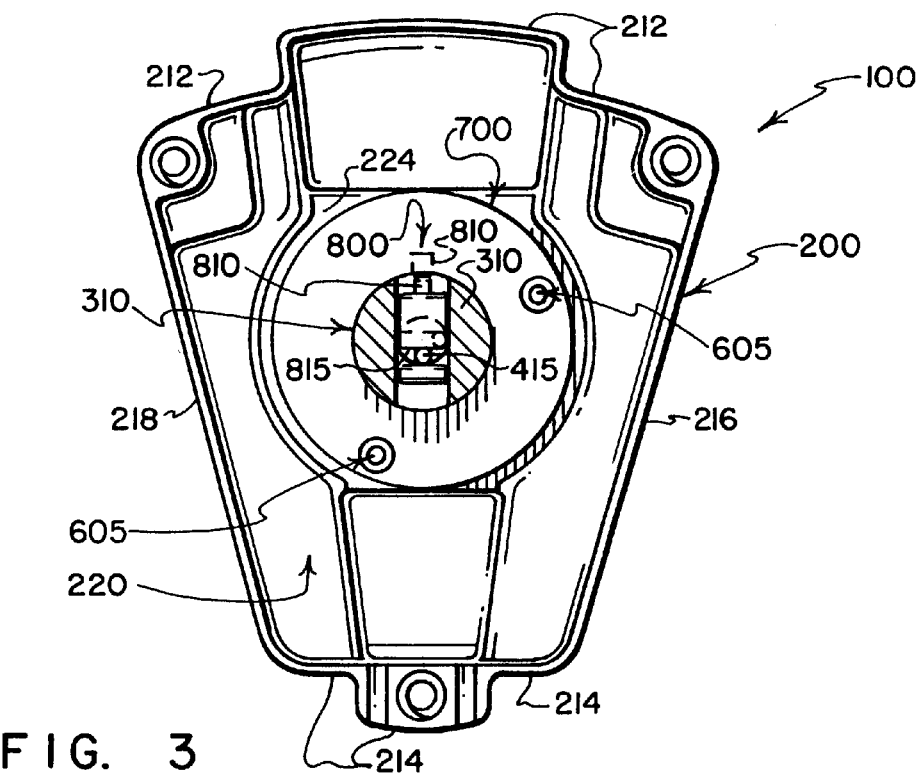
FIG. 3 is a rear elevational view of the housing of the lock, but with other components of the lock shown in cross-section as seen from a plane indicated by a line 3—3 in FIG. 2.
Figure 4:
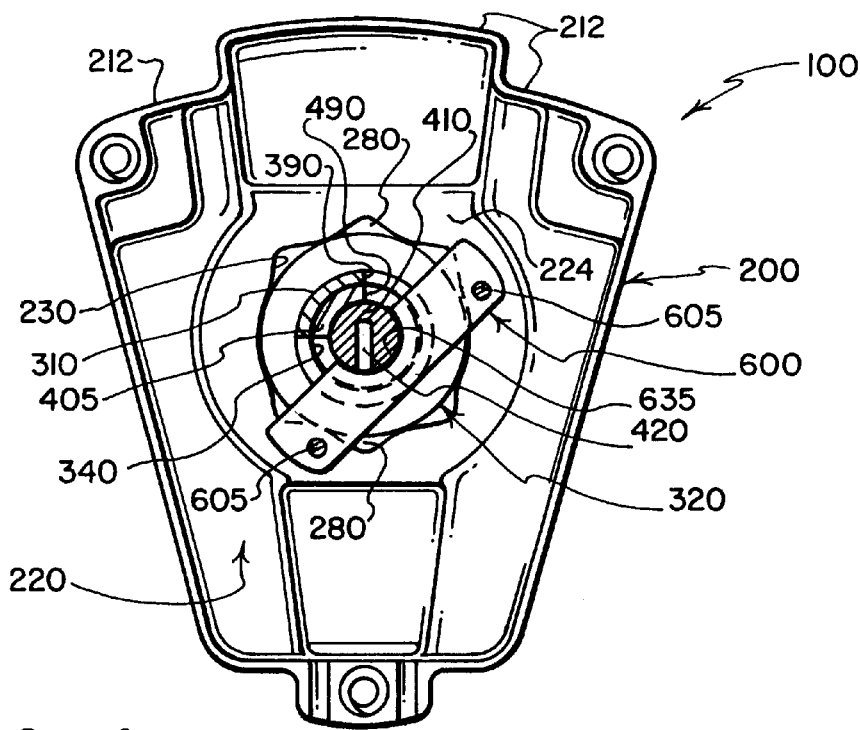
FIG. 4 is a rear elevational view similar to FIG. 3, but with other lock components shown in cross-section as seen from a plane indicated by a line 4—4 in FIG. 2.

Referring to FIGS. 3 and 6, the purpose served by the lock mechanism 400 is to position (in response to operation of the lock mechanism by the key 500) a cylindrical-shaped cam 415 which is carried at the rear end of the plug 410—and to thereby cause the extensible retractable bolt 800 to move within the knob passage 380 to extend a reduced diameter end region 810 of the bolt into the groove 90 of the switch sleeve 60 to drivingly connect the knob 300 and the switch 50, and to withdraw the end region 810 of the bolt 800 from the groove 90 of the switch sleeve 60 into the passage 380 of the knob 300 to disestablish a driving connection between the knob 300 and the switch 50. In FIG. 3, the retracted position of the bolt 800 is shown in solid lines, and the extended position of the bolt 800 is shown in phantom.

When the bolt 800 is retracted, the lock mechanism 400 is "locked," and vice versa. The retracted position of the bolt 800 is depicted in FIGS. 5, 13A, 15A, 17A and 19A. When the bolt is retracted, the end region 810 is withdrawn from the sleeve groove 90, whereby no driving connection is provided between the knob 300 and the switch 50, hence the switch sleeve 60 does not rotate out of its OFF position when the knob 300 rotates to its ACC position (see FIGS. 17A and 18A), and does not rotate out of its OFF position when the knob 300 rotates to its ON position (see FIGS. 19A and 20A).

When the bolt 800 is extended, the lock mechanism 400 is "unlocked," and vice versa. The extended position of the bolt 800 is depicted in FIGS. 2, 9, 14A, 16A, 18A and 20A. When the bolt is extended, the end region 810 extends into the sleeve groove 90 to establish a driving connection between the knob 300 and the switch 50 that causes the switch sleeve 60 to rotate to its ACC position when the knob 300 rotates to its ACC position (see FIG. 18A), and that causes the switch sleeve 60 to rotate to its ON position when the knob 300 rotates to its ON position (see FIG. 20A).

Referring to FIG. 6, the cam 415 effectively provides an "eccentric crank" that extends into a circumferentially extending groove 815 of the bolt 800 for moving the bolt 800 up and down in the knob passage 380 in response to quarter-turn rotations of the cam 415 by the plug 410 of the lock mechanism 400. A "down" position of the cam 415 that causes the bolt 800 to be retracted when the lock mechanism 400 is "locked" is depicted in FIGS. 13B, 15B, 17B and 19B. An "up" position of the cam 415 that causes the bolt 800 to extend when the lock mechanism 400 is "unlocked" is depicted in FIGS. 14B, 16B, 18B and 20B.

While the lock mechanism 400 may take any of a variety of commercially available forms (i.e., a number of cylindrical lock assemblies are commercially available from a variety of manufacturers that are designed to provide quarter-turn positioning of a rearwardly extending cam such as the cam 415), a preferred type of lock mechanism is one that is disclosed in the above-referenced Dimpled Key Lock Patents, the disclosures of which are incorporated herein by reference. A lock mechanism of this type has a plug such as the plug 410 that is journaled by a surrounding barrel such as the barrel 405 (portions of which are surrounded by a tubular shell such as the shell 413) to house a plurality of tumblers and springs (such as the depicted tumblers 423 and springs 433) for cooperating with a suitably configured key such as the key 500 to permit the key, when inserted into a key-receiving slot of the plug, to cooperate with the tumblers to rotate the plug between locked and unlocked positions that are separated by a quarter turn of rotation. Inasmuch as the preferred arrangement and the operation of components of the lock mechanism 400 are disclosed in the referenced Dimple Key Lock Patents, and inasmuch as the character of the springs and tumblers that interact to permit and prohibit relative rotation of the plug 410 and the barrel 405 are outside the scope of the present invention, the disclosure of the referenced Dimpled Key Lock Patents need not be repeated here.

Referring to FIG. 13A, a bore 455 is provided in the plug 410, a bore 465 is provided in the barrel 405, and a bore 355 is provided in the tubular body 310 of the knob 300—and the bores 355, 455 and 465 align with the closed-ended bore 755 in the locking plate 700 when the lock mechanism 400 is locked. The bores 355, 455, 465, 755 align regardless of whether the key 500 is inserted into the key-receiving opening 420 as depicted in FIG. 13A, or whether the key 500 is removed as depicted in FIG. 15A so long as the plug 410 is in its locked position and so long as the knob 300 is in its OFF position.

Housed within the plug bore 455 is an inner pin 456 for engaging a side surface of the key 500 when the key 500 is inserted into the key-receiving opening 420.

Carried within the bores 465, 355 of the tubular barrel 405 and the tubular body 310 is a dual-diameter central pin 466 which has a relatively small inner diameter for extending part of the way into the plug bore 455 (when the key 500 is removed as is shown in FIG. 15A), and a relatively larger diameter for extending into the aligned bores 465, 755 (when the key 500 is inserted into the key-receiving opening 420 as is shown in FIG. 13A).

In FIGS. 13A, 14A, 15A, 16A, 17A, 18A, 19A and 20A, the interaction of a set of end-to-end pins that are carried in aligned bores of the plug 410, the barrel 405, the tubular body 310 of the knob 300, and in the locking member 700 is depicted. In FIGS. 13B, 14B, 15B, 16B, 17B, 18B, 19B and 20B, the resulting associated positions of the cam 415 and the bolt 800 are depicted. Each of the "B" FIGURES is associated with one of the "A" FIGURES. For example, the cam and bolt positions that are depicted in FIG. 13B result from the component positions that are depicted in FIG. 13A; the cam and bolt positions shown in FIG. 14B result from the component positions shown in FIG. 14A; and so on. The following table summarizes the eight different component orientations that are depicted in FIGS. 13A through 20B:

inserted—and this completely prevents the knob 300 from being rotated out of its OFF position when the key 500 is inserted.

Also to be noted is that the only condition under which the key 500 can be inserted into the key-receiving opening 420 is when the knob 300 is OFF. Only then the knob 300 is OFF do the passages 755, 465, 455 align to permit the key to push the pins 466, 760 radially outwardly to a point where a shear line between the pins 466, 760 will align with the juncture between the tubular body 310 and the inner diameter of the locking member 700 to enable the tubular body 310 of the knob 300 to rotate relatives to the locking member 700 (hence relative to the housing 200).

What is illustrated by the switch status summary hat appears in the last column of the table just above is that the switch 50 remains OFF except under two very specific circumstances when it is operated at its ACC and ON positions in response to rotation of the knob 300 to its ACC and ON positions, respectively. These two conditions occur only when the lock plug 410 is unlocked. As will be noted, when the lock plug 410 is locked, the knob 300 is "free wheeling" in the sense that it can be rotated between its ACC, OFF and ON positions without causing corresponding movement of the switch sleeve 60.

The knob 300 is, in fact, free to rotate between its ACC, OFF and ON positions at any time when the key 500 is withdrawn from the key-receiving opening 420. When the key is withdrawn, either the inner end of the pin 466 extends into the key-receiving opening 420 as is depicted in FIGS. 16A, 18A and 20A, or the inner end of the pin 466 presses against the inner pin 456 to press the inner end of the inner pin 456 into the key-receiving opening 420 as is depicted in FIGS. 15A, 17A and 19A—and, either of these occurrences will permit the shear line between the adjacent pins 466, 760 to align with the juncture of the tubular body 310 and the locking member 700 so the tubular body 300 is permitted to rotate relative to the housing 200.

As will be apparent from the foregoing description taken in conjunction with the table presented just above, the accompanying drawings and the appended claims, the present invention provides quite a sophisticated lock for high quality motorcycles or other engine powered equipment that will prevent operation of such a vehicle when the key is inserted, and that will provide an operating knob that is "free wheeling" when locked to ensure that the lock is not defeated by forcefully moving the knob to operate an associated ignition switch.

| FIGURES | Key 500 | Knob 300 | Plug 410 | Cam 615 | Bolt 800 | Switch |
|---|---|---|---|---|---|---|
| 13A–13B | INSERTED | OFF | LOCKED | DOWN | RETRACTED | OFF |
| 14A–14B | INSERTED | OFF | UNLOCKED | UP | EXTENDED | OFF |
| 15A–15B | WITHDRAWN | OFF | LOCKED | DOWN | REFRACTED | OFF |
| 16A–16B | WITHDRAWN | OFF | UNLOCKED | UP | EXTENDED | OFF |
| 17A–17B | WITHDRAWN | ACC | LOCKED | DOWN | RETRACTED | OFF |
| 18A–18B | WITHDRAWN | ACC | UNLOCKED | UP | EXTENDED | ACC |
| 19A–19B | WITHDRAWN | ON | LOCKED | DOWN | RETRACTED | OFF |
| 20A–20B | WITHDRAWN | ON | UNLOCKED | UP | EXTENDED | ON |

What FIGS. 13A and 14A interesting illustrate is that the ignition lock 100 permits relatively little to take place when the key 500 is inserted into the key receiving slot 420. The large diameter outer end region of the central pin 466 bridges between the passages 355, 755 of the tubular body 310 and the locking member 700 when the key 500 is While such terms as "horizontally extending," "front," "rear," "forwardly facing," "rearwardly facing," "left," "right," "up," "down" and the like are utilized herein, it will be understood that such terms are used merely to aid the reader in referring to features in the orientations in which they are depicted in the accompanying drawings, and are not to be construed as limiting the scope of the claims that follow.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty exist in the invention disclosed.

What is claimed is:

1. A key operated lock adapted to be installed in an opening of a mounting panel that has a front face and a rear face at opposite ends of the opening, comprising:
    a) means for defining a tubular body for extending through the opening of the mounting panel for defining a central passage that opens through a forward end region of the tubular body, wherein the central passage extends substantially coaxially about an imaginary rotation axis;
    b) means for defining a key operated lock cylinder assembly 1) that is housed within the central passage, and 2) that includes a tubular barrel which journals a plug for rotation about the rotation axis between locked and unlocked positions, wherein the plug defines a key-receiving opening that extends rearwardly along the rotation axis from near the forward end region of the central passage, and wherein the plug has a rear end region which defines a cam that rotates with the plug between the locked and unlocked positions, and 3) that includes additional means for defining a lock mechanism for cooperating with a suitably configured key win key is inserted into the key-receiving opening to a fully inserted position A) to rotate the plug to the unlocked position when the fully inserted key is rotated in one direction about the rotation axis, B) to rotate the plug to the locked position when the fully inserted key is rotated in the opposite direction about the rotation axis, and C) to permit removal of a fully inserted key only when the plug is rotated to the locked and unlocked positions; and,
    c) means for retaining the tubular body in the opening of the mounting panel and for retaining the key operated lock cylinder assembly in the central passage including means for defining an elongate bar for being connected to the mounting panel and for being slidably received within aligned slots that are formed in overlying portions of the means for defining a tubular body and in the barrel of the means for defining a key operated lock cylinder assembly without engaging the plug of the means for defining a key operated lock cylinder assembly, wherein the aligned slots extend transversely with respect to the rotation axis and closely receive the means for defining an elongate bar in a slip fit to prevent forward and rearward movements of the means for defining a tubular body and the means for defining a key operated lock cylinder assembly relative to the mounting panel while permitting such relative rotation as is required to enable the plug of the means for defining a key operated lock cylinder assembly to be unlocked and locked by rotation of the key when inserted to the fully inserted position in the key-receiving opening; and,
    d) wherein the means for defining a tubular body is rotatable about the rotation axis relative to the mounting panel, and the aligned slots are configured to permit rotation about the rotation axis of the means for defining a tubular body relative to the mounting panel between first and second angular positions when the plug of the means for defining a key operated lock cylinder assembly is in the locked and unlocked positions.

2. The lock of claim 1 additionally including detent means interposed between the means for defining a tubular body and the mounting panel for releasably retaining the means for defining a tubular body in at least a selected one of the first and second angular positions.

3. The lock of claim 2 wherein the detent means is operable to releasably retain the means for defining a tubular body not only in each of said first and second angular positions but also in a third angular position about said axis relative to the mounting panel, and the aligned slots are configured to permit rotation of the means for defining a tubular body about the rotation axis relative to the mounting panel between said first, second and third angular positions when the plug of the means for defining a key operated lock cylinder assembly is in the locked and unlocked positions.

4. The lock of claim 1 additionally including means for preventing key insertion movably supported by the means for defining a tubular body and by the means for defining a key operated lock cylinder assembly for blocking insertion of the key to the fully inserted position when the means for defining a tubular body is rotated to a position other than the first angular position.

5. The lock of claim 4 wherein the means for preventing key insertion includes pin means 1) for being supported within transversely extending bores defined by the means for defining a key operated lock cylinder assembly, by the tubular body, and by means for defining a locking plate adapted to be connected to the mounting panel and located adjacent the tubular body, 2) for being engaged by the key when the key is inserted into the key-receiving opening, and 3) for being moved out of the key-receiving opening as the key is inserted to the fully inserted position and at least partially into the transversely extending bore defined by the locking plate so as to prevent rotation of the means for defining a tubular body relative to the mounting plate when the key is inserted to the fully inserted position, with movement of the pin means into the transversely extending bore of the means for defining a locking plate being only when the tubular body means is in the first an position.

6. The lock of claim 5 wherein the means for defining a locking plate takes the form of an annular member that extends closely about peripheral portions of the means for defining a tubular body and is adapted to be connected to the mounting panel by fastener means that extends through aligned holes formed through the annular member and through the means for defining an elongate bar.

7. The lock of claim 1 wherein the means for defining a key operated lock cylinder assembly includes a plurality of round-ended tumblers that project into the key-receiving opening for engaging dimple recesses formed in opposite sides of the key when the key is in the fully inserted position.

8. The lock of claim 7 wherein the means for defining a key operated lock cylinder assembly also includes biasing means for cooperatively engaging the round-ended tumblers when the means for defining a key operated lock cylinder assembly is locked and unlocked to enable the key to be withdrawn from the key-receiving opening when the means for defining a key operated lock cylinder assembly is locked and unlocked.

9. The lock of claim 1 additionally including means for preventing the means for defining a tubular body from rotating out of the first angular position when the key is inserted to the fully inserted position in the key-receiving opening.

10. The lock of claim 1 wherein the aligned slots are adapted to extend in a plane that closely parallels the rear face of the mounting panel, and a connection of the means for defining an elongate bar with the mounting panel also serves to hold the means for defining an elongate bar in engagement with the rear face of the mounting panel.

11. The lock of claim 1 wherein the means for defining a key operated lock cylinder assembly includes means for performing a locking carried in transversely extending passages formed in tubular barrel and in the plug, which passages align to permit the means for performing a locking function to extend into the key-receiving opening when the key is removed from the key-receiving opening.

12. The lock of claim 11 additionally including:
 a) a flat surface formed on one side of the tubular barrel near a rear end region of the means for defining a key operated lock cylinder assembly; and,
 b) means for defining a flat projection within the central passage of the tubular body for engaging the flat surface on the tubular barrel to prevent relative rotation between the tubular barrel and the means for defining a tubular body.

13. A key operated lock for selectively positioning a cam, comprising:
 a) means for defining a mounting panel having a front face, a rear face, and a first passage that opens through the front and rear faces, wherein the first passage extends substantially coaxially about an imaginary rotation axis;
 b) means for defining a knob having an enlarged front end region having a rearwardly facing shoulder adjacent the front face of the means for defining a mounting panel, for defining a tubular body that extends rearwardly from the enlarged front end region thorough the first passage and rearwardly beyond the rear face of the means for defining a mounting panel along the rotation axis about which the means for defining a knob may be rotated relative to the means for defining a mounting panel between first and second angular positions, and for defining a second passage that extends coaxially along the rotation axis through the enlarged front end region and at least part of the way through the tubular body;
 c) means for defining a key operated lock cylinder having an elongate, generally cylindrical assembly that is housed within the second passage, that has a key-receiving opening which extends rearwardly along the rotation axis from a forward end region of the means for defining a key operated lock cylinder and a cam at a rearward end region of the means for defining a key operated lock cylinder, wherein the means for defining a key operated lock cylinder includes locking means 1) for enabling a suitably configured key to be inserted into the key-receiving opening to a fully inserted position and removed from the key-receiving opening at each of two different rotary orientations of the key-receiving opening that correspond to locked and unlocked conditions of the locking means, 2) for causing the cam to be positioned in one of two predetermined positions when the key is removed from the key-receiving opening with the locking means unlocked, and 3) for causing the cam to be positioned in the other of the two predetermined positions when the key is removed from the key-receiving opening with the locking means locked; and,
 d) retaining means for retaining the tubular body in the first passage and for retaining the generally cylindrical assembly in the second passage including an elongate bar having at least one of its opposite end regions overlying the rear face of the mounting panel and being connected to the mounting panel, with a central portion of the elongate bar extending into aligned slots defined by the tubular body and the generally cylindrical assembly so as to prevent relative forward and rearward movements of the knob and the generally cylindrical assembly relative to the mounting panel while permitting rotation of the means for defining a knob relative to the mounting panel between said first and second angular positions, and while permitting the locking means to move the cam between said predetermined positions.

14. The lock of claim 13 additionally including detent means interposed between the means for defining a knob and the mounting panel for releasably retaining the means for defining a knob in each of said first and second angular positions.

15. The lock of claim 14 wherein the detent means is operable to releasably retain the tubular body not only in each of said first and second angular positions but also in a third angular position about said axis relative to the mounting panel, and the aligned slots are configured to permit rotation of the tubular body about the rotation axis relative to the mounting panel between said first, second and third angular positions when the locking means positions the cam in a selected one of said predetermined positions.

16. The lock of claim 13 additionally including means for controlling key insertion carried in aligned passages defined by the means for defining a key operated lock cylinder and by the tubular body for selectively preventing said key from being inserted into the means for defining a key operated lock cylinder to the fully inserted position to thereby prevent the means for defining a key operated lock cylinder from being locked and unlocked when the means for defining a knob is rotated out of said first angular position.

17. The lock of claim 16 wherein the means for controlling key insertion includes means for performing a locking function supported in the aligned passages for being engaged by the key when the key is inserted to the fully inserted position and for being pushed, when engaged by the inserted key, outwardly relative to the axis of rotation and into still another aligned passage that is defined by an annular member that extends closely about peripheral portions of the tubular body.

18. The lock of claim 13 wherein the means for defining a key operated lock cylinder includes a plurality of round-ended tumblers that project into the key-receiving opening for engaging dimple recesses formed in opposite sides of the key when the key is in its fully inserted position.

19. The lock of claim 18 wherein the means for defining a key operated lock cylinder also includes biasing means for engaging the round-ended tumblers when the means for defining a key operated lock cylinder is locked and unlocked, to enable the key to be withdrawn from the key-receiving opening when the means for defining a key operated lock cylinder is locked or unlocked.

20. The lock of claim 13 additionally including means for preventing the means for defining a tubular body from rotating out of the first angular position when the key is inserted in the key-receiving opening.

21. The lock of claim 13 wherein the aligned slots extend in a plane that closely parallels the rear face of the mounting panel, and the connection of the elongate bar with the mounting panel also serves to hold the elongate bar in engagement with the rear face of the mounting panel.

22. In a key operated lock of the type having an outer member that defines a first passage that extends coaxially about an imaginary axis of rotation, a tubular body that is journaled for rotation within the first passage and that defines a second passage of smaller cross-section than the first passage that extends coaxially about the rotation axis, a tubular barrel nested within and connected to the tubular body for rotation therewith and defining a third passage of smaller cross-section than the second passage that extends coaxially about the rotation axis, and an inner member having an outer diameter that is journaled for rotation within the third passage, the improvement comprising means for concurrently 1) retaining the inner member within the third passage while permitting at least about a quarter turn of rotation of the inner member relative to the tubular barrel, and 2) retaining the tubular barrel and the tubular body within tie second and first passages, respectively, while permitting at least about a quarter-turn of rotation of the tubular body and the tubular barrel relative to the outer member, including aligned slots that extend transversely relative to the rotation axis part-way through the tubular body and the tubular barrel, and means for defining a bar that is received in a close slip fit within the aligned slots to prevent movement of the tubular body and the tubular barrel along the rotation axis relative to the outer member without obstructing rotation of the inner member.

23. The key operated lock of claim 22 including a further improvement wherein the inner member defines a key-receiving opening that extends along the rotation axis, and said means for defining a bar is notched so as to not extend into the key-receiving opening.

24. The key operated lock of claim 23 additionally including means for obstructing insertion of the key fully into the key-receiving opening except when the inner member is rotated to one predefined position relative to the tubular body.

25. The key operated lock of claim 24 additionally including means for preventing rotation of the tubular body and the tubular barrel relative to the outer member when the key is fully inserted in the key-receiving opening.

26. The key operated lock of claim 22 wherein the inner member is rotatable relative to the tubular body and the tubular barrel between locked and unlocked positions, and including means for performing a locking function being carried by the inner member and by the tubular barrel for engaging the key when the key is inserted into the key-receiving opening, and for permitting the key to be withdrawn from the key-receiving opening when the inner member is in each of its locked and unlocked positions.

27. An ignition lock comprising means for defining a housing having a mounting panel having a front wall with an opening formed therethrough, means for defining an operator for being positioned by hand and for defining a tubular body for extending through the mounting panel opening, means for defining a key operated lock cylinder for being housed by the tubular body of the operator means and for defining an inner element that is rotatable relative to an outer element of the means for defining a key operated lock cylinder, aligned slots defined by the means for defining an operator and by the outer element of the means for defining a key operated lock cylinder at a location behind the front wall, and retainer means for extending into the aligned slots and for being connected to the housing means for releasably retaining the means for defining an operator and the means for defining a key operated lock cylinder in place on the means for defining a housing 1) while permitting the means for defining an operator to rotate relative to the means for defining a housing between at least "off" and "on" positions, 2) and while also permitting the inner element of the means for defining a key operated lock cylinder to rotate relative to the means for defining an operator between "locked" and "unlocked" positions when an appropriately configured key is inserted into the means for defining a key operated lock cylinder.

28. An ignition lock comprising: a housing; a hand positioned operator journaled in a first passage defined by the housing for rotary movement relative to the housing between a plurality of predetermined angular positions about an imaginary rotation axis that extends through the first passage; a key operated lock cylinder mounted in a second passage that extends coaxially about the rotation axis and that is defined by the operator, wherein the lock cylinder has an inner element that is rotatable within an outer element of the lock cylinder and relative to the operator between locked and unlocked positions; means for defining an extensible-retractable bolt carried by the operator for extension relative to the lock cylinder in response to rotation of the inner element of the lock cylinder to the unlocked position to establish a driving connection with an ignition switch operator when the inner element of the lock cylinder is in the unlocked position, and for retraction relative to the lock cylinder in response to rotation of the inner element of the lock cylinder to the locked position to disestablish a driving connection with the ignition switch operator when the inner element of the lock cylinder is in the locked position; and, retainer means for retaining the key operated lock cylinder in the second passage and the operator in the first passage including means for defining a bar that is connected to the housing for being received in a slip fit within aligned transversely extending slots formed in the operator and the outer element of the lock cylinder.

29. The ignition lock of claim 28 wherein the plurality of predetermined angular positions includes first, second and third angular positions, and the aligned slots are configured to permit rotation about the rotation axis of the hand positioned operator relative to the housing among the first, second and third angular positions when the inner element of the lock cylinder is in each of the locked and unlocked positions.

30. The ignition lock of claim 29 additionally including means defining a detent interposed between the hand positioned operator and the housing for releasably retaining the hand positioned operator in the first, second and third angular positions.

31. The ignition lock of claim 29 additionally including means for preventing key insertion connected to the land positioned operator for blocking insertion of a key to a fully inserted position within a key-receiving opening of the lock cylinder when the hand positioned operator is rotated to a position other than the first angular position.

32. The ignition lock of claim 31 wherein the means for preventing key insertion includes means for performing a locking function supported within a first transversely extending bore of the hand positioned operator for extending into the key-receiving opening for being engaged by the key when the key is inserted into the key-receiving opening and for being moved out of the key-receiving opening as the key is inserted to the fully inserted position and into a second transversely extending bore defined by a receiving member that is connected to the housing, with movement of the means for performing a locking function into the second transversely extending bore being permitted only when the first and second transversely extending bores are coaxially aligned when the hand positioned operator is in the first angular position.

33. The ignition lock of claim 32 wherein the receiving member takes the form of an annular member that extends closely about peripheral portions of the hand positioned operator and is connected to the housing by fastener means for extending through aligned holes formed through the annular member and through the retainer means.

34. The ignition lock of claim 31 wherein the lock cylinder includes a plurality of round-ended tumblers that project into the key-receiving opening for engaging dimple recesses formed in opposite sides of the key when the key is in the fully inserted position.

35. The ignition lock of claim 31 additionally including means for preventing rotation of the hand positioned operator out of the first angular position when the key is inserted to the fully inserted position in the key-receiving opening.

36. The ignition lock of claim 28 wherein the aligned slots extend in an imaginary plane that closely parallels a rear face of the housings and the connection of the retainer means with the housing also serves to hold the retainer means in engagement with the rear face of the housing.

37. The ignition lock of claim 31 wherein the key operated lock cylinder includes at least one spring-biased tumbler carried in transversely extending passages formed in the inner and outer elements of the lock cylinder, which passages align to permit the spring-biased tumbler to extend into the key-receiving opening when the key is removed from the key-receiving opening when the lock cylinder is locked and unlocked.

38. The ignition lock of claim 37 additionally including:
a) a flat surface formed on one side of the outer element near a rear end region of the key operated lock cylinder; and,
b) a flat formation defined within the second passage of the hand positioned operator for engaging the flat surface on the outer element to prevent relative rotation between the tubular barrel and the hand positioned operator.

39. In a key operated ignition lock of the type having a housing that surrounds portions of a protected space adapted to house an operating member of an electrical switch of the type that is rotatable about a rotation axis between first, second and third angular operating positions, wherein the rotation axis is oriented to extend forwardly-rearwardly through the protected space, and wherein the housing has a front wall that defines 1) a mounting panel having a front surface that faces away from said space and an opposed rear surface that faces toward said space, and 2) a first passage that extends through the mounting panel and opens at opposite ends through the front and rear faces, the improvement comprising:
a) operator means 1) for defining a tubular body that is adapted to extend through the first passage coaxially along the rotation axis to a location adjacent the operating member of the electrical switch, and 2) for being rotatable about the rotation axis between first, second and third angular positions of the operator means that are the same as the first, second and third angular operating positions of the operating member of the electrical switch;
b) a second passage defined by the operator means and extending coaxially along the rotation axis;
c) bolt means carried by the operator means in a transversely extending passage defined by the tubular body that communicates with the second passage for being movable between a retracted position wherein the bolt means provides no driving connection between the operator means and the operating member of the electrical switch, and an extended position wherein the bolt means is adapted to establish a driving connection between the operator means and the operating member of the electrical switch;
d) means for defining a key operated lock mechanism for moving the bolt means between the extended and retracted positions to selectively establish and disestablish a driving connection between the operator means and the operating member, wherein means for defining a key operated lock cylinder includes a generally cylindrical assembly of components positioned within the second passage including a key cylinder having an outer element that journals an inner element which defines a key-receiving opening and is rotatable relative to the operator means between locked and unlocked positions, wherein the inner element has cam means connected thereto for engaging and moving the bolt means between the extended and retracted positions; and,
e) retaining means for concurrently 1) retaining the operator means in the first passage while permitting the operator means to rotate among the first, second and third angular positions of the operator means, and 2) retaining the generally cylindrical assembly within the second passage while permitting the inner element to rotate between the locked and unlocked positions, including aligned slots that extend transversely relative to the rotation axis part-way through the operator means and part-way thorough the outer element, and a bar received in a close slip fit within the aligned slots to prevent movement of the operator means and the lock mechanism means along the rotation axis relative to the housing without obstructing said rotation of the operator means and without obstructing said rotation of the inner element of the lock mechanism means.

40. The key operated ignition lock of claim 39 additionally including detent means interposed between the operator means and the housing for releasably retaining the operator means in the first, second and third angular positions.

41. The key operated ignition lock of claim 39 additionally including means for preventing key insertion connected to the operator means for blocking insertion of a key to a fully inserted position within the key-receiving opening when the operator means is rotated to a position other than the first angular position.

42. The key operated ignition lock of claim 41 wherein the means for preventing key insertion includes means supported within first transversely extending bores formed in the operator means and in the inner and outer elements of the lock mechanism means for extending into the key-receiving opening for being engaged by the key when the key is inserted into the key-receiving opening and for being moved out of the key-receiving opening as the key is inserted to the fully inserted position and into a second transversely extending bore defined by a receiving member that is connected to the housing, with movement of the means for performing a locking function into the second transversely extending bore being permitted only when the first and second transversely extending bores are coaxially aligned when the operator means is in the first angular position.

43. The key operated ignition lock of claim 42 wherein the receiving member takes the form of an annular member that extends closely about peripheral portions of the operator means and is connected to the housing by fastener means that extends through aligned holes formed through the annular member and through the bar.

44. The key operated ignition lock of claim 41 wherein the lock mechanism means includes a plurality of round-ended tumblers that project into the key-receiving opening for engaging dimple recesses defined in opposite side surfaces of the key when the key is in the fully inserted position.

45. The key operated ignition lock of claim 44 wherein the lock mechanism also includes biasing means for engaging the round-ended tumblers when the lock mechanism is locked and unlocked, to enable the key to be withdrawn from the key-receiving opening when the lock mechanism is locked and unlocked.

46. The key operated ignition lock of claim 41 additionally including means for preventing the operator means from rotating out of the first angular position when the key is inserted to the fully inserted position in the key-receiving opening.

47. The key operated ignition lock of claim 39 wherein the aligned slots extend in an imaginary plane that closely parallels a rear face of the mounting panel, and the connection of the bar with the housing also serves to hold the bar in engagement with the rear face of the mounting panel.

48. A key operated ignition lock comprising:
   a) an operating knob;
   b) housing means for supporting the operating knob for rotation about a rotation axis between first and second angular positions, wherein the operating knob defines a central passage extending therethrough along the rotation axis;
   c) means for defining a key-receiving plug that is mounted in the central passage for rotation about the rotation axis between locked and unlocked positions in response to turning of a key when inserted to a fully in-serted position within a key-receiving passage defined by the means for defining a key-receiving plug;
   d) retractable-extensible bolt means for establishing a driving connection between the operating knob and an electrical switch to enable the operating knob to operate the electrical switch in response to rotation of the operating knob between the first and second angular positions when the plug means is rotated to its unlocked position, and for disestablishing a driving connection between the operating knob and the electrical switch to prevent the operating knob from operating the electrical switch when the plug means is rotated to its locked position;
   e) means for extending closely about peripheral portions of the operating knob when the operating knob in the first and second angular positions, and for defining an outer bore that extends toward said peripheral portions along an imaginary radius that intersects the rotation axis;
   f) a central bore that extends through the operating knob along the radius and that aligns with the outer bore when the operating knob is in the first angular position;
   g) an inner bore that extends thorough the plug along the radius and opens into the key-receiving passage and that aligns with the central bore when the plug is in a selected one of the unlocked and unlocked positions and when the operating knob is in the first angular position; and,
   h) means for performing a locking function carried in the inner, central and outer bores for cooperating 1) to block rotation of the operating knob when the key is inserted in the key-receiving passage, 2) to permit rotation of the operating knob when the key is withdrawn from the key-receiving passage, and 3) for preventing insertion of the key into the key-receiving passage when the operating knob is rotated out of the first angular position.

49. The key operated lock of claim 48 wherein the means for performing a locking function includes a plurality of pins arranged end-to-end in the inner, central and outer bores, wherein spring means is provided in the outer bore for biasing the plurality of pins radially inwardly toward the rotation axis when the inner, central and outer bores are aligned, and wherein the pins are configured such that, when an innermost one of the pins is engaged by a key that is inserted into the key-receiving passage, another of the pins is positioned to bridge between the means for extending closely about peripheral portions of the operating knob and the operating knob to block relative rotation therebetween.

50. The key operated lock of claim 49 wherein the pins are configured such that, when the innermost one of the pins is not engaged by a key because the key is not inserted into the key-receiving passage, a line of juncture residing between the outermost pin and an adjacent one of the pins permits the operating knob to rotate out of the first angular position.

51. The key operated lock of claim 48 wherein the means for performing a locking function includes a plurality of pins arranged end-to-end in the inner, central and outer bores, wherein spring means is provided in the outer bore for biasing the plurality of pins radially inwardly toward the rotation axis when the inner, central and outer bores are aligned, and the pins are configured such that, when the operating knob is rotated out of the first angular position, an innermost one of the pins extends into the key-receiving passage to obstruct insertion of the key into the key-receiving passage.

52. The key operated lock of claim 48 wherein the means for performing a locking function includes a plurality of pins arranged end-to-end in the inner, central and outer bores, wherein spring means is carried in the outer bore, and wherein the pins are configured such that, when the innermost one of the pins is not engaged by a key because the key is not inserted into the key-receiving passage, a line of juncture residing between the outermost pin and an adjacent one of the pins permits the operating knob to rotate out of the first angular position.

53. A key operated ignition lock, comprising:
   a) housing means for supporting an operating knob for rotation about a rotation axis between a plurality of predetermined angular positions including first and second angular positions, wherein the operating knob provides a hand positioned operator journaled in a first central passage defined by the housing means for rotation about the rotation axis between said plurality of angular positions, and wherein the hand positioned operator of the operating knob defines a second central passage extending therethrough along the rotation axis;
   b) a key operated lock cylinder mounted in the second central passage, wherein the key operated lock cylinder includes an outer element and an inner element in the form of a key-receiving plug that is mounted in a third central passage that is defined by the outer element to extend coaxially about the rotation axis, wherein the key-receiving plug is rotatable within the third central passage about the rotation axis relative to the hand positioned operator between locked and unlocked positions in response to turning of a key when inserted to a fully inserted position within a key-receiving passage defined at least in part by the inner element;

c) means for defining an extensible-retractable bolt carried by the operator for extension relative to the lock cylinder in response to rotation of the inner element of the lock cylinder to the unlocked position wherein the extensible-retractable bolt is adapted to establish a driving connection between the operating knob and an operator of an ignition switch to enable the operating knob to operate the ignition switch in response to rotation of the operating knob between the first and second angular positions when the inner element is rotated to the unlocked position, and for retraction relative to the lock cylinder in response to rotation of the inner element when the inner element is rotated to the locked position to disestablish a driving connection between the operating knob and the operator of the ignition switch to prevent the operating knob from operating the ignition switch when the inner element of the lock cylinder is in the locked position;

d) retainer means for retaining the key operated lock cylinder in the second central passage and the operator in the first central passage including means for defining a bar that is connected to the housing means for being received in a slip fit within aligned transversely extending slots formed in the operator and in the outer element;

e) means for extending closely about peripheral portions of the operating knob when the operating knob is in the first and second angular positions, and for defining an outer bore that extends toward said peripheral portions along an imaginary radius that intersects the rotation axis;

f) a central bore that extends through the operating knob along the radius and that aligns with the outer bore when the operating knob is in the first angular position;

g) an inner bore that extends through the plug along the radius and opens into the key-receiving passage, and that aligns with the central bore when the plug is in a selected one of the unlocked and unlocked positions and when the operating knob is in the first angular position; and, h) means for performing a locking function carried in the inner, central and outer bores for cooperating 1) to block rotation of the operating knob when the key is inserted in the key-receiving passage, 2) to permit rotation of the operating knob when the key is withdrawn from the key-receiving passage, and 3) for preventing insertion of the key into the key-receiving passage when the operating knob is rotated out of the first angular position.

54. The key operated lock of claim 53 wherein the means for performing a locking function includes a plurality of pins arranged end-to-end in the inner, central and outer bores, wherein spring means is provided in the outer bore for biasing the plurality of pins radially inwardly toward the rotation axis when the inner, central and outer bores are aligned, and wherein the pins are configured such that, when an innermost one of the pins is engaged by a key that is inserted into the key-receiving passage, another of the pins is positioned to bridge between the means for extending closely about peripheral portions of the operating knob and the operating knob to block relative rotation therebetween.

55. The key operated lock of claim 54 wherein the pins are configured such that, when the innermost one of the pins is not engaged by a key because the key is not inserted into the key-receiving passage, a line of juncture residing between the outermost pin and an adjacent one of the pins permits the operating knob to rotate out of the first angular position.

56. The key operated lock of claim 53 wherein the means for performing a locking function includes a plurality of pins arranged end-to-end in the inner, central and outer bores, wherein spring means is provided in the outer bore for biasing the plurality of pins radially inwardly toward the rotation axis when the inner, central and outer bores are aligned, and the pins are configured such that, when the operating knob is rotated out of the first angular position, an innermost one of the pins extends into the key-receiving passage to obstruct insertion of the key into the key-receiving passage.

57. The key operated lock of claim 53 wherein the means for performing a locking function includes a plurality of pins arranged end-to-end in the inner, central and outer bores, wherein spring means is carried in the outer bore, and wherein the pins are configured such that, when the innermost one of the pins is not engaged by a key because the key is not inserted into the key-receiving passage, a line of juncture residing between the innermost pin and an adjacent one of the pins aligns with a juncture residing between the plug and the operating knob to permit the operating knob to rotate out of the first angular position.

* * * * *

UNITED STATES PATENT AND TRADEMARK OFFICE
CERTIFICATE OF CORRECTION

PATENT NO. : 6,257,031 B1
DATED : July 10, 2001
INVENTOR(S) : Michael O. Misner

Page 1 of 1

It is certified that error appears in the above-identified patent and that said Letters Patent is hereby corrected as shown below:

Column 4,
Line 31, "3 . 4A" should read -- 14A --.

Column 6,
Line 40, "Refer-" should begin a new paragraph.

Column 10,
Line 14, "hat" should read -- that --.

Column 11,
Line 35, "win" should read -- when the --.

Column 12,
Line 44, after "being" insert -- permitted --.

Column 13,
Line 12, after "locking" insert -- function --.

Column 15,
Line 20, "tie" should read -- the --.

Signed and Sealed this

Twelfth Day of March, 2002

Attest:

Attesting Officer

JAMES E. ROGAN
Director of the United States Patent and Trademark Office